(12) United States Patent
Lv et al.

(10) Patent No.: US 12,424,010 B2
(45) Date of Patent: Sep. 23, 2025

(54) CHARACTER RECOGNITION MODEL TRAINING METHOD AND APPARATUS, CHARACTER RECOGNITION METHOD AND APPARATUS, DEVICE AND STORAGE MEDIUM

(71) Applicant: BEIJING BAIDU NETCOM SCIENCE TECHNOLOGY CO., LTD., Beijing (CN)

(72) Inventors: Pengyuan Lv, Beijing (CN); Chengquan Zhang, Beijing (CN); Shanshan Liu, Beijing (CN); Meina Qiao, Beijing (CN); Yangliu Xu, Beijing (CN); Liang Wu, Beijing (CN); Xiaoyan Wang, Beijing (CN); Kun Yao, Beijing (CN); Junyu Han, Beijing (CN); Errui Ding, Beijing (CN); Jingdong Wang, Beijing (CN); Tian Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 339 days.

(21) Appl. No.: 18/168,759

(22) Filed: Feb. 14, 2023

(65) Prior Publication Data
US 2023/0215203 A1    Jul. 6, 2023

(30) Foreign Application Priority Data
Aug. 16, 2022    (CN) .......................... 202210983230.9

(51) Int. Cl.
*G06V 30/19*    (2022.01)
*G06F 7/76*    (2006.01)
(Continued)

(52) U.S. Cl.
CPC ........ *G06V 30/19147* (2022.01); *G06F 7/764* (2013.01); *G06F 16/24* (2019.01);
(Continued)

(58) Field of Classification Search
CPC ............. G06V 30/10; G06V 30/19173; G06V 30/19147; G06V 30/1912; G06V 30/148;
(Continued)

(56) References Cited

U.S. PATENT DOCUMENTS

2020/0020098 A1* 1/2020 Odry ..................... G06T 7/0012
2020/0372225 A1 11/2020 Xu et al.
(Continued)

FOREIGN PATENT DOCUMENTS

CN    105325003 A    2/2016
CN    112529150 A    3/2021
(Continued)

OTHER PUBLICATIONS

Lin et al., Sketch-BERT: Learning Sketch Bidirectional Encoder Representation from Transformers by Self-supervised Learning of Sketch Gestalt, May 19, 2020 [retrieved Mar. 13, 2025], Cornell University:arXiv, version [v1], 10 pages. (Year: 2020).*
(Continued)

*Primary Examiner* — Henok Shiferaw
*Assistant Examiner* — Dennis Rosario
(74) *Attorney, Agent, or Firm* — Tucker Ellis LLP

(57) ABSTRACT

The present disclosure provides a character recognition model training method and apparatus, a character recognition method and apparatus, a device and a medium, relating to the technical field of artificial intelligence, and specifically to the technical fields of deep learning, image processing and computer vision, which can be applied to scenarios such as character detection and recognition technology. The specific implementing solution is: partitioning an untagged
(Continued)

training sample into at least two sub-sample images; dividing the at least two sub-sample images into a first training set and a second training set; where the first training set includes a first sub-sample image with a visible attribute, and the second training set includes a second sub-sample image with an invisible attribute; performing self-supervised training on a to-be-trained encoder by taking the second training set as a tag of the first training set, to obtain a target encoder.

17 Claims, 6 Drawing Sheets

(51) Int. Cl.

| | |
|---|---|
| G06F 16/24 | (2019.01) |
| G06F 16/33 | (2025.01) |
| G06F 16/43 | (2019.01) |
| G06F 16/53 | (2019.01) |
| G06F 16/583 | (2019.01) |
| G06F 16/73 | (2019.01) |
| G06F 16/83 | (2019.01) |
| G06F 18/21 | (2023.01) |
| G06F 18/213 | (2023.01) |
| G06F 18/214 | (2023.01) |
| G06F 18/25 | (2023.01) |
| G06F 40/258 | (2020.01) |
| G06F 40/279 | (2020.01) |
| G06N 3/045 | (2023.01) |
| G06N 3/0455 | (2023.01) |
| G06N 3/0895 | (2023.01) |
| G06N 3/09 | (2023.01) |
| G06V 10/26 | (2022.01) |
| G06V 10/40 | (2022.01) |
| G06V 10/42 | (2022.01) |
| G06V 10/44 | (2022.01) |
| G06V 10/62 | (2022.01) |
| G06V 10/70 | (2022.01) |
| G06V 10/77 | (2022.01) |
| G06V 10/774 | (2022.01) |
| G06V 10/778 | (2022.01) |
| G06V 10/80 | (2022.01) |
| G06V 20/40 | (2022.01) |
| G06V 20/69 | (2022.01) |
| G06V 20/70 | (2022.01) |
| G06V 30/00 | (2022.01) |
| G06V 30/10 | (2022.01) |
| G06V 30/148 | (2022.01) |
| G06V 30/18 | (2022.01) |
| G06V 30/24 | (2022.01) |
| G06V 30/242 | (2022.01) |
| G06V 30/244 | (2022.01) |
| G06V 30/32 | (2022.01) |
| G06V 40/12 | (2022.01) |
| G06V 40/16 | (2022.01) |
| G06V 40/18 | (2022.01) |
| G06V 40/30 | (2022.01) |
| G10L 15/02 | (2006.01) |
| G10L 15/06 | (2013.01) |

(52) U.S. Cl.
CPC .............. *G06F 16/33* (2019.01); *G06F 16/43* (2019.01); *G06F 16/53* (2019.01); *G06F 16/5846* (2019.01); *G06F 16/73* (2019.01); *G06F 16/83* (2019.01); *G06F 18/21* (2023.01); *G06F 18/213* (2023.01); *G06F 18/2155* (2023.01); *G06F 18/253* (2023.01); *G06F 40/258* (2020.01); *G06F 40/279* (2020.01); *G06N 3/045* (2023.01); *G06N 3/0455* (2023.01); *G06N 3/0895* (2023.01); *G06N 3/09* (2023.01); *G06V 10/26* (2022.01); *G06V 10/40* (2022.01); *G06V 10/42* (2022.01); *G06V 10/44* (2022.01); *G06V 10/62* (2022.01); *G06V 10/70* (2022.01); *G06V 10/7715* (2022.01); *G06V 10/7753* (2022.01); *G06V 10/7784* (2022.01); *G06V 10/7788* (2022.01); *G06V 10/7792* (2022.01); *G06V 10/80* (2022.01); *G06V 10/806* (2022.01); *G06V 20/46* (2022.01); *G06V 20/695* (2022.01); *G06V 20/70* (2022.01); *G06V 30/00* (2022.01); *G06V 30/10* (2022.01); *G06V 30/148* (2022.01); *G06V 30/15* (2022.01); *G06V 30/18* (2022.01); *G06V 30/18143* (2022.01); *G06V 30/18152* (2022.01); *G06V 30/19127* (2022.01); *G06V 30/19167* (2022.01); *G06V 30/24* (2022.01); *G06V 30/242* (2022.01); *G06V 30/245* (2022.01); *G06V 30/333* (2022.01); *G06V 40/1347* (2022.01); *G06V 40/1353* (2022.01); *G06V 40/1359* (2022.01); *G06V 40/168* (2022.01); *G06V 40/193* (2022.01); *G06V 40/382* (2022.01); *G10L 15/02* (2013.01); *G10L 15/063* (2013.01); *G06F 18/2163* (2023.01); *G06F 18/2178* (2023.01); *G06F 2218/08* (2023.01); *G06T 2207/20021* (2013.01); *G06T 2207/20081* (2013.01); *G06T 2207/20112* (2013.01); *G06V 2201/09* (2022.01)

(58) Field of Classification Search
CPC .. G06V 10/764; G06V 30/153; G06V 30/242; G06V 10/26; G06V 30/245; G06V 30/40; G06V 30/15; G06V 30/191; G06V 30/19113; G06V 10/774; G06V 20/695; G06V 20/70; G06V 30/19153; G06V 30/19167; G06V 10/7753; G06V 20/698; G06V 10/765; G06V 10/809; G06V 10/82; G06V 30/18057; G06V 10/44; G06V 30/1801; G06N 3/08; G06N 3/0455; G06N 3/09; G06N 3/0895; G06N 3/088; G06N 3/084; G06F 18/214; G06F 18/2155; G06F 18/241; G06F 18/2413; G06F 16/55; G06F 18/256; G06F 18/254; G06F 18/24; G06T 2207/20081; G06T 9/00; G06T 7/10; G06T 2207/20021; G06T 5/60; G06T 9/002; G06T 2207/20112

See application file for complete search history.

(56) References Cited

U.S. PATENT DOCUMENTS

| | | | |
|---|---|---|---|
| 2021/0150757 A1* | 5/2021 | Mustikovela | ...... G06V 10/7784 |
| 2021/0232773 A1* | 7/2021 | Wang | ........................ G06F 18/21 |
| 2022/0300735 A1* | 9/2022 | Kelly | ...................... G06F 16/93 |

FOREIGN PATENT DOCUMENTS

| | | | | |
|---|---|---|---|---|
| CN | 113657399 A | | 11/2021 | |
| CN | 114418069 A | | 4/2022 | |
| CN | 114445812 A | | 5/2022 | |
| CN | 114445831 A | | 5/2022 | |
| CN | 114462489 A | | 5/2022 | |
| CN | 114495102 A | | 5/2022 | |
| CN | 114529904 A | * | 5/2022 | ........... G06F 18/214 |

(56) References Cited

FOREIGN PATENT DOCUMENTS

| | | | | | |
|---|---|---|---|---|---|
| CN | 114549904 | A | * | 5/2022 | ............ G06F 18/241 |
| CN | 114565751 | A | * | 5/2022 | |
| CN | 114596566 | A | * | 6/2022 | ............ G06F 18/214 |
| CN | 114724133 | A | | 7/2022 | |
| CN | 114821045 | A | | 7/2022 | |
| CN | 115511969 | A | * | 12/2022 | |
| EP | 3 598 339 | A1 | | 1/2020 | |

OTHER PUBLICATIONS

Gong et al., Pay Better Attention to Attention: Head Selection in Multilingual and Multi-Domain Sequence Modeling, Jun. 21, 2021 [ retrived Mar. 10, 2025], Cornell University:arXiv, version [v1], 15 pages. https://doi.org/10.48550/arXiv.2106.10840 (Year: 2021).*

Suzuki,Clustering as Attention: Unified Image Segmentation with Hierarchical Clustering, Oct. 11, 2022 [retrieved Mar. 10, 2025], version [v3], 16 pages. https://doi.org/10.48550/arXiv.2205.099449 (Year: 2022).*

Zhang, Using Structural Regularities for a Procedural Reconstruction of Urban Environments From Satellite Imagery [dissertation], May 2022 [retrieved Mar. 13, 2025], Purdue University, 155 pages. (Year: 2022).*

Coquenet, Towards End-to-end Handwritten Document Recognition, Oct. 20, 2022 [retrieved Mar. 13, 2025], Cornell University: arXiv, version [v2], pp. 183. (Year: 2022).*

Google Translate machine translation of CN 114565751 A to Cao, OCR Recognition Model Training Method, OCR Recognition Method And Related Device, translated Mar. 10, 2025, 24 pages. (Year: 2025).*

Search machine translation of CN 113592769 A to Zhou, Image Processing And Data Rendering Method, Device And Medium, translated Mar. 10, 2025, 44 pages. (Year: 2025).*

Search machine translation of CN 114596566 A to Jiang, Method And Related Device Recognition Text, translated Mar. 5, 2025, 28 pages. (Year: 2025).*

Search machine translation of CN 114549904 A to Wang et al., Scene Text Recognition System Based On Consistency Regular Training, translated Mar. 5, 2025, 7 pages. (Year: 2025).*

Search machine translation of CN 114549904 A to Guo et al., Visual Processing And Model Training Method, Device, Storage Medium And Program Product, translated Mar. 13, 2025, 19 pages. (Year: 2025).*

Dong et al., Multi-Fact Correction in Abstractive Text Summarization, Oct. 6, 2020 [retrieved Jul. 25, 2025], Cornell University: arXiv, version [v1], 12 pages. https://doi.org/10.48550/arXiv.2010.02443 (Year: 2020).*

Fang et al., ABINet++: Autonomous, Bidirectional and Iterative Language Modeling for Scene Text Spotting, Nov. 23, 2022 (first instance of public dissemination) [retrieved Jul. 25, 2025], IEEE Transactions on Pattern Analysis and Machine Intelligence, vol. 45, Issue: 6, Jun. 1, 2023, pp. 7123-7141. (Year: 2022).*

[item V continued] DOI: 10.1109/TPAMI.2022.3223908 (Year: 2022).*

Fan et al., Reconstruction-Aware Prior Distillation for Semi-supervised Point Cloud Completion, Apr. 21, 2022 [retrieved Jul. 25, 2025], Cornell University: arXiv, version [v2], 14 pages. https://doi.org/10.48550/arXiv.2204.09186 (Year: 2022).*

Notice of Reasons for Refusal of corresponding Japanese Application No. 2023-025380, dated Dec. 19, 2023, 10 pages.

Lyu et al., "MaskOCR: Text Recognition with Masked Encoder-Decoder Pretraining", Jun. 1, 2022, 13 pages.

Office Action of corresponding Chinese Application No. 202210983230.9, dated Mar. 10, 2023, 8 pages.

Appalaraju et al., "DocFormer: End-to-End Transformer for Document Understanding", dated Sep. 20, 2021, 22 pages.

Notice of registration of corresponding Chinese Application No. 202210983230.9, dated May 25, 2023, 11 pages.

Yuxuan Li, "Research on Automatic Generation of Weibo Short Text Based on User Intention", Master Thesis, Inner Mongolia University of Science and Technology, dated Jun. 5, 2021, 63 pages.

Cheng Peng, "Soft sensor of industrial data based on pre-training", Master's degree thesis, Zhejiang University, dated Mar. 2022, 77 pages.

* cited by examiner

CHARACTER RECOGNITION MODEL TRAINING METHOD AND APPARATUS, CHARACTER RECOGNITION METHOD AND APPARATUS, DEVICE AND STORAGE MEDIUM

CROSS-REFERENCE TO RELATED APPLICATIONS

This application claims priority to Chinese Patent Application No. 202210983230.9, filed on Aug. 16, 2022, which is hereby incorporated by reference in its entirety.

TECHNICAL FIELD

The present disclosure relates to the technical field of artificial intelligence, and specifically to the technical fields of deep learning, image processing and computer vision, applicable to scenarios such as character detection and recognition technology, and particularly relates to a character recognition model training method and apparatus, a character recognition method and apparatus, a device and a medium.

BACKGROUND

At present, OCR (Optical Character Recognition) technology in natural scenes has a wide application base. Generally, for character detection and recognition technology, it is necessary to train a character recognition model, and then use the trained character recognition model to perform character recognition on input images.

However, the character recognition model generally adopts a supervised training method, according to which only features of a small number of tagged images can be learned and the obtained recognition model has no significant improvement on the accuracy of character recognition of images.

SUMMARY

The present disclosure provides a character recognition model training method and apparatus, a character recognition method and apparatus, a device and a medium.

According to a first aspect of the present disclosure, a character recognition model training method is provided, including:
 partitioning an untagged training sample into at least two sub-sample images;
 dividing the at least two sub-sample images into a first training set and a second training set; where the first training set includes a first sub-sample image with a visible attribute, and the second training set includes a second sub-sample image with an invisible attribute; and
 performing self-supervised training on a to-be-trained encoder by taking the second training set as a tag of the first training set, to obtain a target encoder.

According to a second aspect of the present disclosure, a character recognition model training method is provided, including:
 partitioning a synthetic sample into at least two sub-synthetic images, where the synthetic sample includes a synthetic text tag;
 dividing the at least two sub-synthetic images as a first synthetic set and a second synthetic set; where the first synthetic set includes a first sub-synthetic image with a visible attribute, and the second synthetic set includes a second sub-synthetic image with an invisible attribute; and
 performing, based on the first synthetic set and the second synthetic set, supervised training on a to-be-trained decoder to obtain a target decoder corresponding to the to-be-trained decoder.

According to a third aspect of the present disclosure, a character recognition method is provided, including:
 determining a target encoder and a target decoder; where the target encoder is obtained by training based on the character recognition model training method according to the first aspect and various possibilities thereof, and the target decoder is obtained by training based on the character recognition model training method according to the second aspect and various possibilities thereof;
 partitioning a to-be-recognized image into at least two sub-images;
 extracting image features of the sub-images based on the target encoder, to obtain the image features corresponding to the at least two sub-images respectively;
 performing, based on the target decoder and at least two query vectors, decoding calculation on the image features corresponding to the at least two sub-images respectively, to obtain a decoded feature sequence corresponding to the at least two sub-images; and
 obtaining a target text of the to-be-recognized image according to the decoded feature sequence.

According to a fourth aspect of the present disclosure, an electronic device is provided, including:
 at least one processor; and
 a memory communicatively connected to the at least one processor; where,
 the memory stores an instruction executable by the at least one processor, and the instruction is executed by the at least one processor to cause the at least one processor to perform the method according to the first aspect, the second aspect, or the third aspect and various possibilities thereof.

According to an fifth aspect of the present disclosure, a non-transitory computer-readable storage medium storing a computer instruction is provided, where the computer instruction is used to cause a computer to perform the method according to the first aspect, the second aspect, or the third aspect and various possibilities thereof.

According to the technology of the present disclosure, the use of a supervised training method solves a problem that only a small number of features of tagged images can be learned and a problem that the obtained recognition model has low character recognition accuracy for images. By performing self-supervised training on an encoder by adopting an untagged training sample, and performing supervised training on a decoder by adopting a tagged training sample, and through a combination of supervised training and unsupervised training, a model can be enabled to learn prior information of image and text at the same time, which improves recognition accuracy of the model. By using the target encoder and the target decoder obtained by training to perform text recognition on a to-be-recognized image, the obtained target text is more accurate and the recognition accuracy is higher.

It should be understood that the content described in this section is not intended to identify key or important features of the embodiments of the present disclosure, nor is it intended to limit the scope of the present disclosure. Other features of the present disclosure will be readily understood from the following description.

BRIEF DESCRIPTION OF DRAWINGS

The drawings are used for a better understanding of the present solution, and do not constitute a limitation of the present disclosure.

DESCRIPTION OF EMBODIMENTS

Exemplary embodiments of the present disclosure are described below with reference to the accompanying drawings, including various details of the embodiments of the present disclosure to facilitate understanding, which should be regarded as merely exemplary. Therefore, those skilled in the art should realize that various changes and modifications can be made to the embodiments described herein without departing from the scope and spirit of the present disclosure. Similarly, for clarity and conciseness, the description of well-known functions and structures is omitted in the following description.

The technical solution of the present disclosure can be applied to the field of image character recognition, by adopting a self-supervised mode to train an encoder and a supervised mode to train a decoder, a high-accuracy image feature extraction model can be obtained, so that high-accuracy character recognition can be obtained through the high-accuracy feature extraction, and the accuracy of character recognition can be improved.

In related technologies, image recognition methods can be adopted, and supervised character recognition and unsupervised character recognition can be used. The supervised character recognition generally needs to obtain tagged data through data synthesis, but there is often a big difference between the synthesized data and the actual images. Therefore, improvement of image recognition accuracy by using supervised training is limited. For an existing unsupervised matrix, it is required to use untagged training samples to learn prior information. However, current solutions only focus on pre-training of a feature extraction module of the encoder, while ignoring training for text semantics, and its accuracy is not high either.

In order to solve the technical problem of low accuracy of the existing technical solutions, the present disclosure uses an untagged training sample to perform self-supervised training on an encoder, and uses a tagged training sample to perform supervised training on a decoder, and through a combination of supervised training and unsupervised training, a model can be enabled to learn prior information of image and text at the same time, which improves recognition accuracy of the model. By using the target encoder and the target decoder obtained by training to perform text recognition on a to-be-recognized image, the obtained target text is more accurate and the recognition accuracy is higher.

The present disclosure relates to the technical field of artificial intelligence, and specifically to the technical fields of deep learning, image processing and computer vision, applicable to scenarios such as character detection and recognition technology, and in particular, to a character recognition model training method and apparatus, a character recognition method and apparatus, a device and a medium.

The technical solution of the present disclosure will be described in detail below with reference to the drawings.

Figure 1:
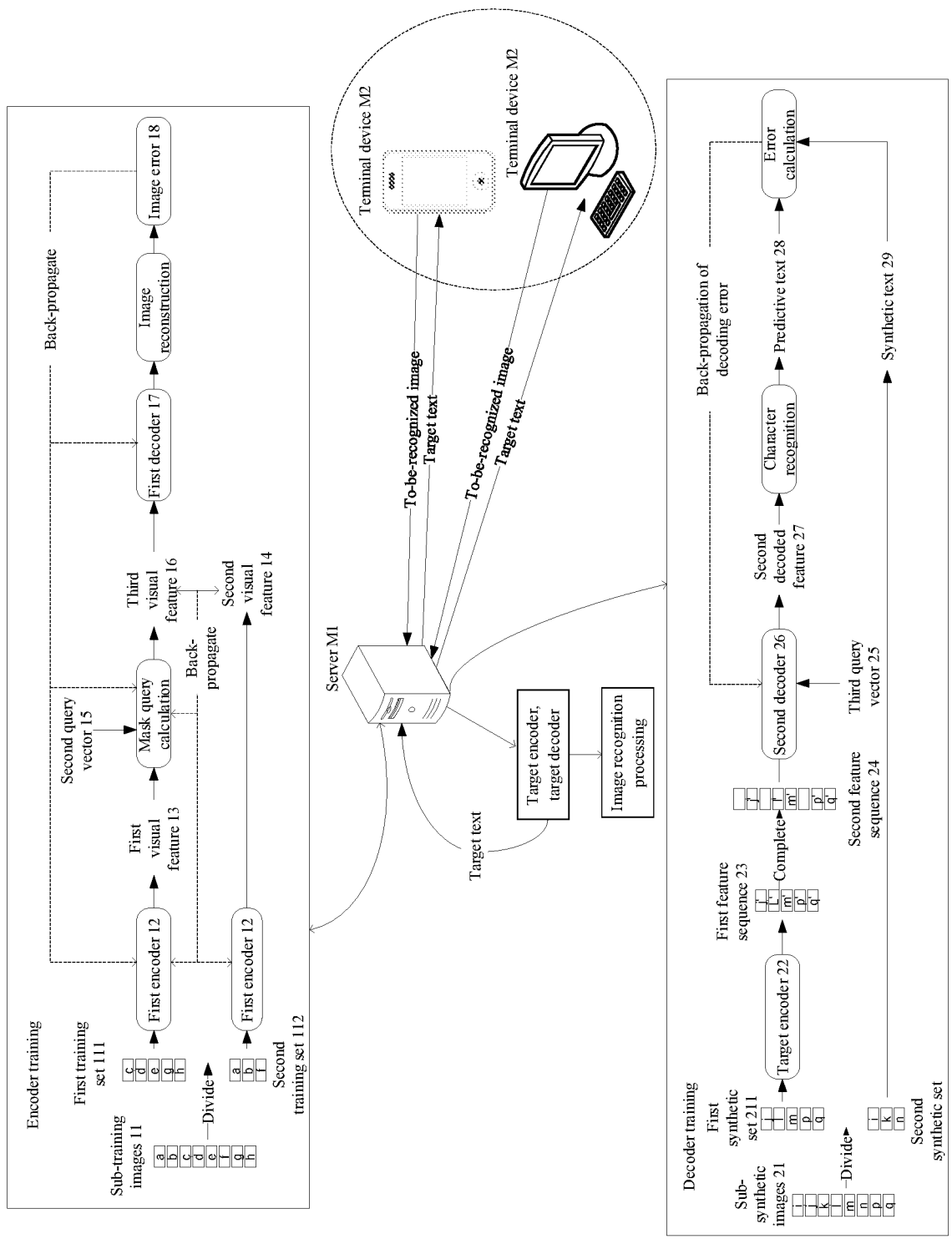
FIG. 1 is a schematic application diagram of a character recognition system provided according to an embodiment of the present disclosure.

As shown in FIG. 1, FIG. 1 is a schematic application diagram of a character recognition system provided according to an embodiment of the present disclosure, where the system may include a server M1, and the server M1 may train an encoder and a decoder for image character recognition.

Referring to FIG. 1, during training of the encoder, an untagged training sample may be partitioned into at least two sub-sample images 11. The at least two sub-sample images may be divided into a first training set 111 corresponding to a first sub-sample image and a second training set 112 corresponding to a second sub-sample image. The first training set 111 and the second training set 112 may perform self-supervised training on a to-be-trained encoder. The specific training process may be: inputting the first sub-sample image and the second sub-sample image into a first encoder 12 respectively, to obtain a first visual feature 13 corresponding to the first sub-sample image and a second visual feature 14 corresponding to the second sub-sample image. Mask query calculation may be performed based on a second query vector 15 marked by a mask setting strategy and the first visual feature 13, to obtain a third visual feature 16. Feature error calculation can be performed between the third visual feature 16 and the second visual feature 14, by taking that the third visual feature 16 infinitely approaches the second visual feature 14 as an objective for back-propagation. At the same time, image reconstruction may be performed on the third visual feature 16 after being calculated by the first decoder 17, to obtain an image reconstruction result, so as to determine an image error 18 between the image reconstruction result and the second sub-sample image. The first encoder is updated by using the feature error and the image error, and the first decoder is updated by using the image error, that is, back-propagation to the first encoder 12 and the first decoder 17, until the feature error satisfies a first error condition and the image error satisfies a second error condition, to obtain the latest updated first encoder as the target encoder.

In an embodiment, after the encoder training is finished, the decoder can be trained by using the target encoder obtained by training. Referring to FIG. 1, during training of the decoder, a tagged synthetic sample may be partitioned into at least two sub-synthetic images 21. The at least two sub-synthetic images 21 are divided as a first synthetic set 211 and a second synthetic set 212. A first feature sequence 23 of the first sub-synthetic image in the first synthetic set 211 can be extracted by using the target encoder 22, and a second feature sequence 24 can be obtained by performing feature completion on the first feature sequence 23 by using an image position, in the synthetic sample 21, of the second sub-synthetic image in the second synthetic set 212. Both the second feature sequence 24 and a third query vector 25 are input into a second decoder 26, and feature calculation of a second decoded feature 27 is performed by the second decoder 26. A predictive text 28 is obtained based on text recognition processing of the second decoded feature 27. Text error calculation is performed between the predictive text 28 and a synthetic text 29 of the second sub-synthetic image in a synthetic text tag, to obtain a decoding error. The decoding error can be used to update the second decoder until a third error condition is satisfied, to obtain the target decoder.

In practical application, the server M1 can establish a communication connection with the terminal device M2, and the terminal device may include, for example, terminals such as a mobile phone, a tablet computer, etc. The terminal device M2 can send a to-be-recognized image to the server M1. The server M1 obtains the to-be-recognized image, and can use the trained target encoder and target decoder to extract image features of the to-be-recognized image, so as to perform text recognition processing on the extracted features and obtain the target text. The server M1 can also feed the obtained target text back to the terminal device M2. Through interaction between the terminal device and the server, online text recognition of images is realized, and the efficiency and accuracy of text recognition are improved.

Figure 2:
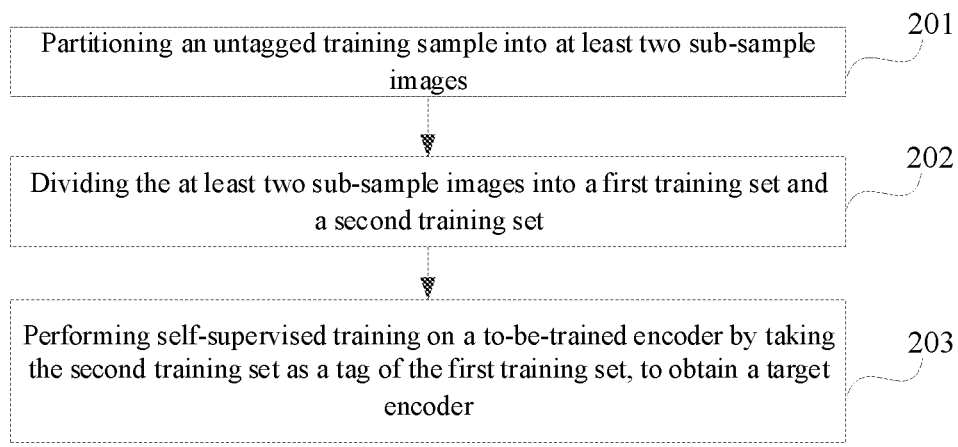
FIG. 2 is a flowchart of a character recognition model training method provided according to a first embodiment of the present disclosure.

FIG. 2 is a flowchart of a character recognition model training method provided according to a first embodiment of the present disclosure. The character recognition model training method can be configured for a character recognition model training apparatus, and the character recognition model training apparatus may be located in an electronic device. The character recognition model training method may include the following steps.

201: partitioning an untagged training sample into at least two sub-sample images.

In an embodiment, the partitioning the untagged training sample into the at least two sub-sample images may include partitioning, based on an image partitioning strategy, an untagged training sample into at least two sub-sample images. The image partitioning strategy may include a partitioning number in length of the image and a partitioning number in width of the image, and the training sample may be evenly partitioned into at least two sub-sample images according to the partitioning number in length of the image and the partitioning number in width of the image.

Specifically, the image partitioning strategy may also be patch processing of the image, and the image can be partitioned into at least two image blocks in terms of patch, and the sub-sample images may be image blocks after the training sample is patched.

The training sample may be images collected from natural environment, and the training sample is untagged.

202: dividing the at least two sub-sample images into a first training set and a second training set; where the first training set includes a first sub-sample image with a visible attribute, and the second training set includes a second sub-sample image with an invisible attribute.

The first training set may include one or at least two first sub-sample images. The second training set includes one or at least two second sub-sample images.

203: performing self-supervised training on a to-be-trained encoder by taking the second training set as a tag of the first training set, to obtain a target encoder.

In an embodiment, taking the second training set as the tag of the first training set may specifically lie in taking the second sub-sample image in the second training set as the tag of the first sub-sample image. Since the second sub-sample image has an invisible attribute and the first sub-sample image has a visible attribute, the feature representation of the second sub-sample image with the invisible attribute can be predicted by using the feature representation of the first sub-sample image with the visible attribute, so that self-supervised training is performed on the to-be-trained encoder with a training objective that the feature representation predicted by the first sub-sample image is the same as the feature representation of the second sub-sample image, to obtain the target encoder. The self-supervised training can specifically refer to the completion of the encoder training with the second training set of the training sample itself as the tag of the first training set, without setting a tag for the training sample.

In the embodiment of the present disclosure, the untagged training sample is partitioned into at least two sub-sample images, for untagged sample images, the at least two sub-sample images of the training sample are divided into two training sets by using the dividing standard between the visible attribute and the invisible attribute, the second training set of the two training sets is used as the tag of the first training set, so that the untagged first training set has a tag, and the difference analysis between the prediction results of the second training set and the first training set is used to iteratively update the encoder, thus realizing the self-supervised training on the to-be-trained encoder, to obtain the target encoder. By dividing of the training sets, the self-supervised training of the encoder can be realized, and the training accuracy of the encoder can be improved.

It can be understood that in the present embodiment, after the encoder training is finished and the target encoder is obtained, the target encoder can be used to perform supervised training on the decoder. As an alternative embodiment, the method of the present embodiment may also include training steps of the decoder. For specific training steps of the decoder, please refer to embodiments such as FIG. 4-FIG. 5, which will not be repeated here. The training method involved in the present disclosure can be applied to image character recognition.

It should be noted that the character recognition model training method of the present disclosure can be applied to the application scenarios of image character recognition, that is, the target encoder and the target decoder obtained by training can be used for image character recognition so as to improve the accuracy of image character recognition.

Figure 3:
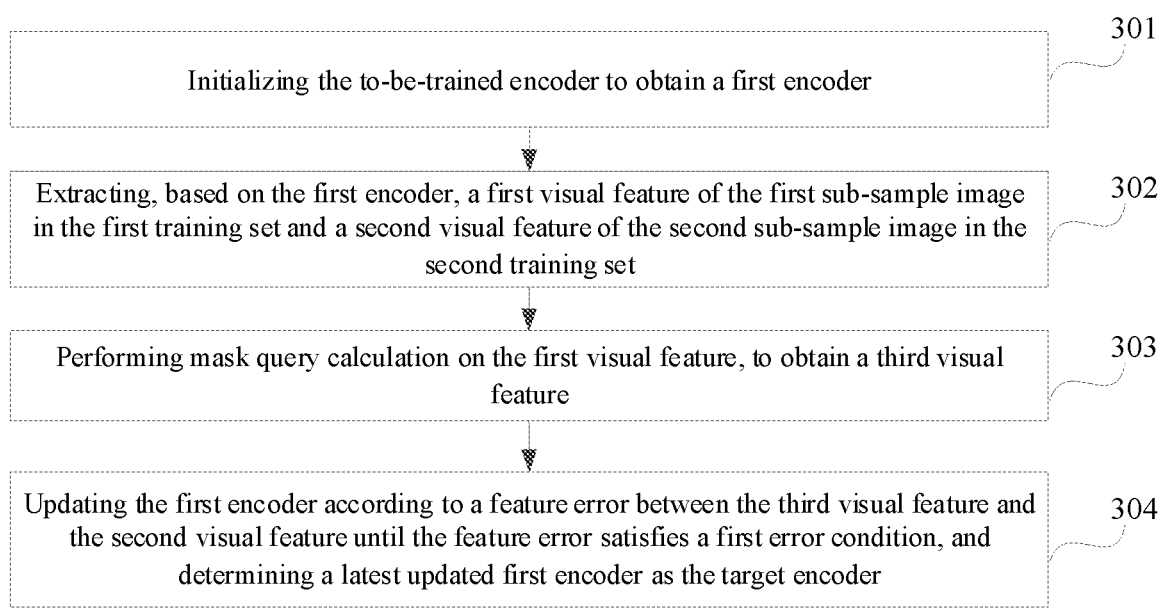
FIG. 3 is a flowchart of a character recognition model training method provided according to a second embodiment of the present disclosure.

To implement training of the encoder, referring to FIG. 3, FIG. 3 is a flowchart of a character recognition model training method provided according to a second embodiment of the present disclosure. The difference from the previous embodiment is that the performing the self-supervised training on the to-be-trained encoder by taking the second training set as the tag of the first training set, to obtain the target encoder may include the following steps.

301: initializing the to-be-trained encoder to obtain a first encoder.

302: extracting, based on the first encoder, a first visual feature of the first sub-sample image in the first training set and a second visual feature of the second sub-sample image in the second training set.

303: performing mask query calculation on the first visual feature, to obtain a third visual feature.

304: updating the first encoder according to a feature error between the third visual feature and the second visual feature until the feature error satisfies a first error condition, and determining a latest updated first encoder as the target encoder.

In an embodiment, the encoder in the present disclosure may include an encoder corresponding to a VIT (Vision Transformer) network. For a network structure of the to-be-trained encoder, reference can be made to the VIT network.

The first encoder can be obtained by initializing parameters of the to-be-trained encoder. Parameters of the first encoder can be updated continuously until the end of training.

An embedding vector of the first sub-sample image is input into the first encoder to extract a first visual feature of the first sub-sample image. An embedding vector of the second sub-sample image is input into the first encoder to extract a second visual feature of the second sub-sample image.

In an embodiment, the feature error between the third visual feature and the second visual feature can be represented by a feature distance and a similarity measure, and can be calculated by any distance formula, such as Euclidean distance, Hamming distance or the like. In the present embodiment, the specific calculation manner of the feature error is not limited.

The first error condition may refer to that the feature error is less than a feature threshold. The feature threshold can be set according to requirements of usage.

In the present embodiment, for the to-be-trained encoder, the parameters of the encoder can be continuously trained by updating the parameters of the encoder. When the encoder is being updated, the first visual feature extracted in the first training set by the current first encoder can be used, and the third visual feature obtained by performing mask query calculation on the first visual feature can be a visual feature of the invisible second sub-sample image predicted by using the visible first sub-sample image, that is, the obtained third visual feature infinitely approaches to the second visual feature. The feature error between the second visual feature and the third visual feature can represent the difference between the two features. If the feature error satisfies the first error condition, it can be determined that the encoder training is finished and the accurate target encoder is obtained. Both the first visual feature and the second visual feature come from the training sample, and the sub-sample image of the training sample itself is used as a tag to implement a way of predicting the invisible feature representation through the visible feature representation, thus completing the self-supervised training of the encoder and improving the training accuracy of the encoder.

When the encoder is being updated, two kinds of errors, i.e., the image error and feature error can be used to back-propagate the training of the encoder. As one embodiment, the updating the first encoder according to the feature error between the third visual feature and the second visual feature until the feature error satisfies the first error condition, and the determining the latest updated first encoder as the target encoder include:

initializing a to-be-trained decoder to obtain a first decoder;

determining, based on the first decoder, an image error generated when image reconstruction is performed on the third visual feature;

determining the feature error between the third visual feature and the second visual feature; and updating the first encoder based on the feature error and the image error and updating the first decoder based on the image error until the feature error satisfies the first error condition and the image error satisfies a second error condition, and determining a latest obtained first encoder as the target encoder.

The image error may refer to an image error corresponding to the image reconstruction result of the third visual feature.

The second error condition may refer to that the image error is less than an image error threshold. The image error threshold can be set according to requirements of usage.

In the present embodiment, based on the usage of the feature error, the image error and feature error corresponding to the image reconstructed according to the third visual feature are also used as a reverse feedback adjustment of the encoder, so that more comprehensive and detailed error analysis can be used to realize the reverse adjustment of the encoder, and a higher-accuracy encoder can be obtained. In addition, the first decoder can be updated by using the image error to realize the accurate update of the decoder, and a more accurate decoder can be used to complete the decoding calculation of the visual features, so that the use of the more accurate decoder can have a more positive impact on the training of the encoder, which improves training accuracy of the decoder.

In a possible design, the determining, based on the first decoder, the image error generated when the image reconstruction is performed on the third visual feature includes:

performing decoding calculation processing on the third visual feature by using the first decoder, to obtain a first decoded feature; and obtaining the image error according to an image reconstruction result of the first decoded feature.

In an embodiment, the first decoder can be obtained by initializing parameters of the to-be-trained decoder. Parameters of the first decoder can be updated continuously until the end of training.

In an embodiment, the encoder of the present disclosure may include a decoder corresponding to a transformer network. For a network structure of the to-be-trained decoder, reference can be made to the transformer network.

In the present embodiment, the first decoded feature can be obtained by performing decoding calculation processing on the third visual feature by the first decoder, and the image error can be obtained according to the image reconstruction result of the first decoded feature. In the process of encoder training, a trainable decoder is introduced to ensure the accurate reconstruction of the image with a comprehensive and complete encoding and decoding process, so that the image error can be effectively obtained by using the image reconstruction result.

In some embodiments, the obtaining the image error according to the image reconstruction result of the first decoded feature includes:

performing image reconstruction processing on the first decoded feature, to obtain a first prediction result; and performing image error calculation by using the second sub-sample image and the first prediction result, to obtain the image error.

In an embodiment, image reconstruction processing can be performed on the first decoded feature at an image reconstruction layer to obtain a first prediction result, and the first prediction result is a predictive image. The image reconstruction layer can be a layer in a text learning network to realize image reconstruction.

The first decoded feature is the feature representation of the learned image, and reverse image reconstruction can be performed on the first decoded feature. Specifically, an image reconstruction algorithm can be used, such as an image reconstruction algorithm based on a convolutional neural network. In the present embodiment, specific types of the image reconstruction algorithm are not limited.

In an embodiment, the image error calculation between the second sub-sample image and the first prediction result may include calculating an image distance or an image similarity between the second sub-sample image and the first prediction result, and determining the image error through the image distance or the image similarity. The image distance may include Euclidean distance, Manhattan distance, or the like. In the present embodiment, the calculation manner of the image error is not limited.

In the present embodiment, the first prediction result can be obtained by using the first decoded feature for image reconstruction processing. Through the comparison between the first prediction result obtained by image reconstruction processing and the second sub-sample image, the image error can be accurately determined.

In order to obtain a query vector matching with the second training set, the self-supervised training of the encoder is realized. As an embodiment, the method further includes:
dividing, based on a mask setting strategy, at least two query vectors into a first query vector and a second query vector; where the mask setting strategy includes mask data generated based on a preset first mask ratio; the query vector is a spatial transformation vector corresponding to a basis character string;
the performing the mask query calculation on the first visual feature, to obtain the third visual feature includes:
obtaining, based on feature prediction calculation of the second query vector and the first visual feature, a feature vector corresponding to an occurrence probability of the first visual feature in the second query vector;
performing vector combination on the feature vector corresponding to the first visual feature, to obtain the third visual feature.

In an embodiment, the at least two query vectors (query) may be spatial transformation vectors corresponding to a basic character string. The basic character string may be composed of one or at least two characters, and the characters may include letters, numbers, Chinese characters and/or single symbols in any language. The basic string is subjected to embedding (embedding algorithm) calculation to obtain the query vectors. In addition, the query vectors may also be obtained by calculating through a preset function. For example, the preset function may refer to a vector-generating function:

$$PE_{(pos,2i)}=\sin(pos/10000^{2i/d_{model}})$$

$$PE_{(pos,2i+1)}=\cos(pos/10000^{2i/d_{model}})$$

PE represents a query vector to be generated, pos is a location index of the vector or a vector ID (Identity document, identifier), $d_{model}$ is a total dimension of the query vector to be generated, and i is the dimension of an element in the vector, that is, a dimension order or dimension coordinates of the element.

In a possible design, the feature prediction calculation based on the second query vector and the first visual feature in the present disclosure can be obtained by calculation through a mask query computing network. Input data of the mask query computing network is the second query vector and the first visual feature, and output data is the third visual feature. The mask query computing network is a learnable computing network, which can be updated by back-propagation, that is, if the image error and feature error are determined, the mask query computing network can be updated based on the image error and the feature error. Until the feature error satisfies the first error condition and the image error satisfies the second error condition, the updating of the mask query computing network will be stopped.

In an embodiment, the mask setting strategy may refer to dividing a picture into visible parts and invisible parts according to a fixed first mask ratio. The mask setting strategy may also be used as the basis for obtaining the second query vector of the at least two query vectors. The second query vector may be mask queries (mask vector) determined according to the first mask ratio. The first mask ratio may include a target mask ratio which is set to be higher than a lowest mask value, where the lowest mask value may be obtained by setting, for example, the lowest mask value may be set to 0.9, the first mask ratio may be any value higher than 0.9, and of course, the first mask ratio may be less than 1.

In an embodiment, the mask data may include a mask vector or a mask matrix, and an element value in the mask vector or the mask matrix may include a first value or a second value. Through matrix calculation of the mask data and the at least two query vectors, the first query vector marked by the first value and the second query vector marked by the second value can be obtained. The first value and the second value can be selected from 0 or 1, and they two have different values.

In an embodiment, the feature prediction calculation of the second query vector and the first visual feature can be completed by a Latent contextual regressor.

In the present embodiment, the mask setting strategy is used to perform mask processing on the at least two query vectors, so that the division of the at least two query vectors is consistent with the division of the image. The feature prediction calculation of the second query vector and the first visual feature is a process of using the first visual feature to predict the feature of the invisible second sub-sample image, and the obtained third visual feature can be compared with the second visual feature to obtain the feature error. The mask setting strategy can ensure that the feature of the invisible second sub-sample image can be accurately predicted with the second query vector involved in the calculation, to obtain the third visual feature more similar to the second visual feature, and to improve the feature representation accuracy of the third visual feature.

In a possible design, the dividing the at least two sub-sample images into the first training set and the second training set includes:
dividing the at least two sub-sample images into the first training set and the second training set by using a mask setting strategy.

In an embodiment, the dividing the at least two sub-sample images into the first training set and the second training set by using the mask setting strategy may include:
dividing, according to a fixed first mask ratio, the picture into the visible first training set and the invisible second training set.

In an embodiment, matrix calculation can be performed through the mask data in the mask setting strategy and the at least two sub-sample images, to obtain the first training set and the second training set.

In the present embodiment, the at least two sub-sample images are divided as the first training set and the second training set by using the mask setting strategy. The mask setting strategy can be mask data generated according to the preset first mask ratio, and the at least two sub-sample images can be divided into the visible first training set and the invisible second training set through the mask setting strategy. The images in the first training set have visible attributes, and the images in the second training set have invisible attributes. The mask setting strategy can be used to accurately divide the at least two sub-sample images.

Figure 4:
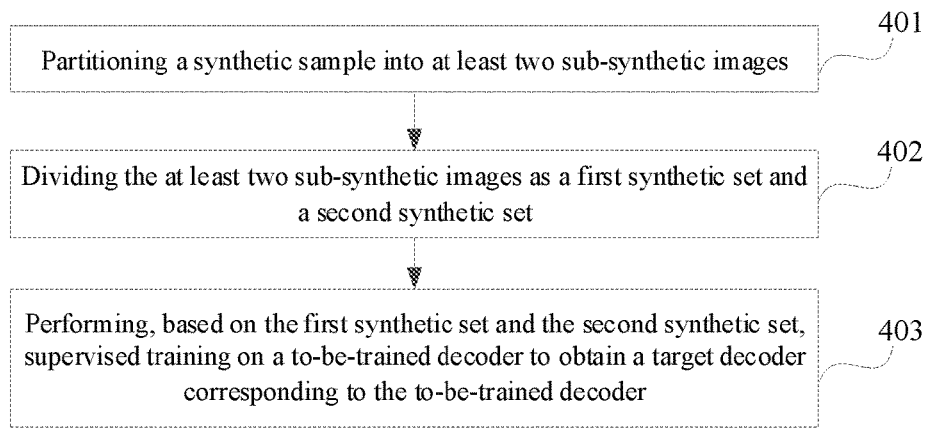
FIG. 4 is a flowchart of a character recognition model training method provided according to a third embodiment of the present disclosure.

As shown in FIG. 4, FIG. 4 is a flowchart of a character recognition model training method provided according to a third embodiment of the present disclosure. The character recognition model training method can be used to train a decoder. The method can be configured for a character recognition model training apparatus, and the character recognition model training apparatus may be located in an electronic device. The character recognition model training method may include the following steps.

401: partitioning a synthetic sample into at least two sub-synthetic images, where the synthetic sample includes a synthetic text tag.

The partitioning the tagged synthetic sample into the at least two sub-synthetic images may include: partitioning, based on an image partitioning strategy, the synthetic sample into the at least two sub-synthetic images. The image partitioning strategy may include a partitioning number in length of the image and a partitioning number in width of the image, and the synthetic sample may be evenly partitioned into at least two sub-training images according to the partitioning number in length of the image and the partitioning number in width of the image.

Specifically, the image partitioning strategy may also be patch processing of the image, and the image can be partitioned into at least two image blocks through the patch, and the sub-synthetic images may be image blocks after the synthetic sample is patched.

The synthetic sample may be an image synthesized by using a synthetic text, and the synthetic text tag is a text which is used to synthesize the sample.

402: dividing the at least two sub-synthetic images as a first synthetic set and a second synthetic set; where the first synthetic set includes a first sub-synthetic image with a visible attribute, and the second synthetic set includes a second sub-synthetic image with an invisible attribute.

The first synthetic set may include one or at least two first sub-synthetic images. The second synthetic set includes one or at least two second sub-synthetic images.

403: performing, based on the first synthetic set and the second synthetic set, supervised training on a to-be-trained decoder to obtain a target decoder corresponding to the to-be-trained decoder.

In an embodiment, the supervised training can also be performed on the to-be-trained decoder by using respective text tags of the respective synthetic sets, to obtain the target decoder corresponding to the to-be-trained decoder.

In the present embodiment, the synthetic sample with the synthetic text tag is used to train the to-be-trained decoder. The synthetic text tag ensures that the training of this decoder is supervised training, so as to realize the supervised training of the decoder.

Figure 5:
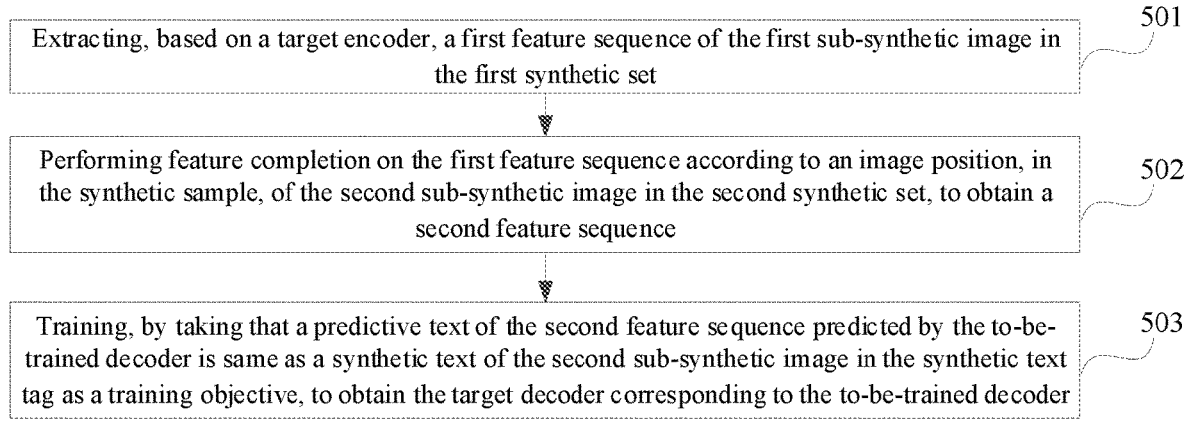
FIG. 5 is a flowchart of a character recognition model training method provided according to a fourth embodiment of the present disclosure.

In a possible design, a fixed encoder can be adopted to train the decoder. As shown in FIG. 5, FIG. 5 is a flowchart of a character recognition model training method provided according to a fourth embodiment of the present disclosure, where the performing, based on the first synthetic set and the second synthetic set, the supervised training on the to-be-trained decoder to obtain the target decoder corresponding to the to-be-trained decoder may include the following steps.

501: extracting, based on a target encoder, a first feature sequence of the first sub-synthetic image in the first synthetic set; where the target encoder is obtained by training based on the character recognition model training method according to any one of the above embodiments.

For the training steps of the target encoder in the present embodiment, reference can be made to the training steps of embodiments such as in FIG. 2-FIG. 3, which will not be repeated here.

502: performing feature completion on the first feature sequence according to an image position, in the synthetic sample, of the second sub-synthetic image in the second synthetic set, to obtain a second feature sequence.

503: training, by taking that a predictive text of the second feature sequence predicted by the to-be-trained decoder is same as a synthetic text of the second sub-synthetic image in the synthetic text tag as a training objective, to obtain the target decoder corresponding to the to-be-trained decoder.

In an embodiment, supervised training on the decoder can be performed by means of a fixed target encoder.

The predictive text of the second feature sequence can be the same as the synthetic text of the second sub-synthetic image in the synthetic text tag, which can be used as a training objective.

In the present embodiment, when performing supervised training on the decoder, the training result of the above encoder (that is, the target encoder) can be used to perform supervised training on the to-be-trained decoder. The target encoder obtained by unsupervised training is used to perform supervised training on the decoder, so as to improve the training accuracy and effect of the decoder.

As one embodiment, the training, by taking that the predictive text of the second feature sequence predicted by the to-be-trained decoder is same as the synthetic text of the second sub-synthetic image in the synthetic text tag as the training objective, to obtain the target decoder corresponding to the to-be-trained decoder may include:

initializing the to-be-trained decoder to obtain a second decoder;

determining the predictive text of the second feature sequence based on the second decoder;

performing text error calculation by using the predictive text and the synthetic text of the second sub-synthetic image in the synthetic text tag, to obtain a decoding error; and updating the second decoder according to the decoding error until the decoding error satisfies a third error condition, and determining a latest obtained second decoder as the target decoder.

The second decoder can decode the second feature sequence, and use the decoded feature for text prediction to obtain the predictive text.

The text error calculation can include text similarity calculation or text distance calculation. The text similarity calculation manner can refer to the calculation of the text similarity between the predictive text and the synthetic text, and the text error can be calculated by using the text similarity algorithm, such as an algorithm of calculating a quantity ratio of same characters. The text distance calculation manner can refer to the calculation of the text distance between the predictive text and the synthetic text, for example, algorithms such as From Word Embeddings To Document Distances are used to calculate the text distance, and the text distance is taken as the text error.

In an embodiment, the third error condition may include that the decoding error is less than a text error threshold. The text error threshold may be obtained by setting.

In the present embodiment, the decoder is continuously trained by updating parameters of the decoder. When the decoder is being updated, the decoding error can be obtained through the text error calculation between the predictive text of the second feature sequence predicted by the second decoder and the synthetic text of the second sub-synthetic image. Through the calculation of the decoding error, accurate reverse feedback to the decoder can be realized, invalid updating of parameters can be avoided, efficiency of parameter updating can be improved, and accuracy of parameter updating can be improved. The obtained target decoder has a higher accuracy.

In a possible design, the determining the predictive text of the second feature sequence based on the second decoder includes:
  acquiring, based on the second sub-synthetic image, a third query vector stored in a token form;
  inputting the third query vector and the second feature sequence into the second decoder, to obtain a second decoded feature; and
  obtaining the predictive text of the second feature sequence based on text recognition processing on the second decoded feature.

In an embodiment, the feature of the second sub-synthetic image can be reduced in dimension by using a mask synthesis strategy, a learnable token or a fixed token is used, and the learned token or the fixed token can be taken as the third query vector.

The third query vector and the second feature sequence can be input into the second decoder for decoding calculation, to obtain the second decoded feature. The predictive text of the second decoded feature being the same as the text of the second sub-synthetic image is taken as a training objective.

In a possible design, for the text recognition processing of the second decoded feature in the present disclosure, a text recognition network can be used to perform the text recognition processing on the second decoded feature. The text recognition network may be a learnable computing network, and if it is determined that the decoding error is obtained, the text recognition network can be updated by using the decoding error, until the decoding error satisfies a third error condition.

In the present embodiment, the third query vector marked with the token can be obtained by performing token identifier processing on the at least two query vectors. Based on the second decoder, decoding calculation can be performed on the third query vector and the second feature sequence, to obtain the second decoded feature. Through the text recognition processing of the second decoded feature, the predictive text of the second feature sequence can be obtained, which improves text recognition accuracy of the second feature sequence.

In some embodiments, the acquiring, based on the second sub-synthetic image, the third query vector stored in the token form includes:
  extracting a feature of the second sub-synthetic image; and
  transforming, based on a token-generating algorithm, the feature of the second sub-synthetic image into the token form, to obtain the third query vector.

In an embodiment, the token-generating algorithm may specifically refer to taking a fixed or a learnable token as the query. The token can be obtained through a manner of learning, and the token-generating algorithm may also refer to a fixed token representation manner, and a fixed token can also be set for the second sub-synthetic image to be taken as the third query vector.

In the present embodiment, the second sub-synthetic image is transformed into the third query vector by using token transformation processing, and through an accurate token identifier, accuracy of the third query vector can be improved.

In a possible design, the performing the feature completion on the first feature sequence according to the image position, in the synthetic sample, of the second sub-synthetic image in the second synthetic set, to obtain the second feature sequence includes:
  determining, according to the image position of the second sub-synthetic image in the synthetic sample, a sequence position of the second sub-synthetic image in a synthetic sequence corresponding to the synthetic sample;
  inserting a completion vector in the sequence position in the first feature sequence, to obtain the second feature sequence. A vector dimension of the completion vector is same as the vector dimension of the first feature sequence.

In an embodiment, the completion vector may be a preset vector of which all values are the same. For example, it may be a vector with all zeros or all ones.

The sequence position may be a position of the second sub-synthetic image in the synthetic sequence. The first feature sequence may be a sequence after the mask, specifically, may be a sequence corresponding to the visible image. If completion is necessary, it is necessary to complete the sequence that is masked. For example, assuming that there is an original feature sequence of four sequences of "abcd", and after it is masked, the first feature sequence is two sequences of "ad", then the two sequences of "bc" that are masked need to be completed, and sequences of "a00d" can be obtained when completion is performed with an all-zero vector. The "abcd" or "0" may refer to vectors. Specifically, reference can be made to completion examples of the first feature sequence 23 to the second feature sequence 24 in FIG. 1.

In the present embodiment, according to the image position of the second sub-synthetic image in the synthetic sample, the sequence position of the second sub-synthetic image in the synthetic sequence can be determined, and the conversion from the image position to the sequence position can be realized, so as to insert the completion vector into the sequence position of the first feature sequence, to obtain the second feature sequence. By determining the sequence position, vector positioning and completion can be realized, and the second feature sequence with higher accuracy can be obtained.

As another embodiment, the dividing the at least two sub-synthetic images as the first sub-synthetic image set and the second sub-synthetic image set includes:
  dividing, based on a mask synthesis strategy, the at least two sub-synthetic images as the first synthetic set and the second synthetic set.

The mask synthesis strategy includes mask data generated based on a preset second mask ratio. For the second mask ratio, reference can be made to related description of the mask ratio in the above embodiments, which will not be repeated here.

In an embodiment, matrix calculation can be performed through the mask data in the mask synthesis strategy and the at least two sub-synthetic images, to obtain the first synthetic set and the second synthetic set. The second mask ratio may include a target mask ratio which is set to be higher than a lowest mask value, where the lowest mask value may be obtained by setting, for example, the lowest mask value may be set to 0.9, the second mask ratio may be any value higher than 0.9, and of course, the second mask ratio may be less than 1. Certainly, other mask dividing manners in related arts can also be applied to the set dividing of the present disclosure, which will not be repeated here.

In the present embodiment, the at least two sub-synthetic images are divided as the first synthetic set and the second synthetic set based on the mask synthesis strategy. The mask synthesis strategy may be mask data generated according to the preset second mask ratio, and the at least two sub-synthetic images can be divided into the visible first synthetic set and the invisible second synthetic set through the mask synthesis strategy. The images in the first synthetic set have visible attributes, and the images in the second synthetic set have invisible attributes. The mask synthesis strategy can be used to accurately divide the at least two sub-synthetic images.

Figure 6:
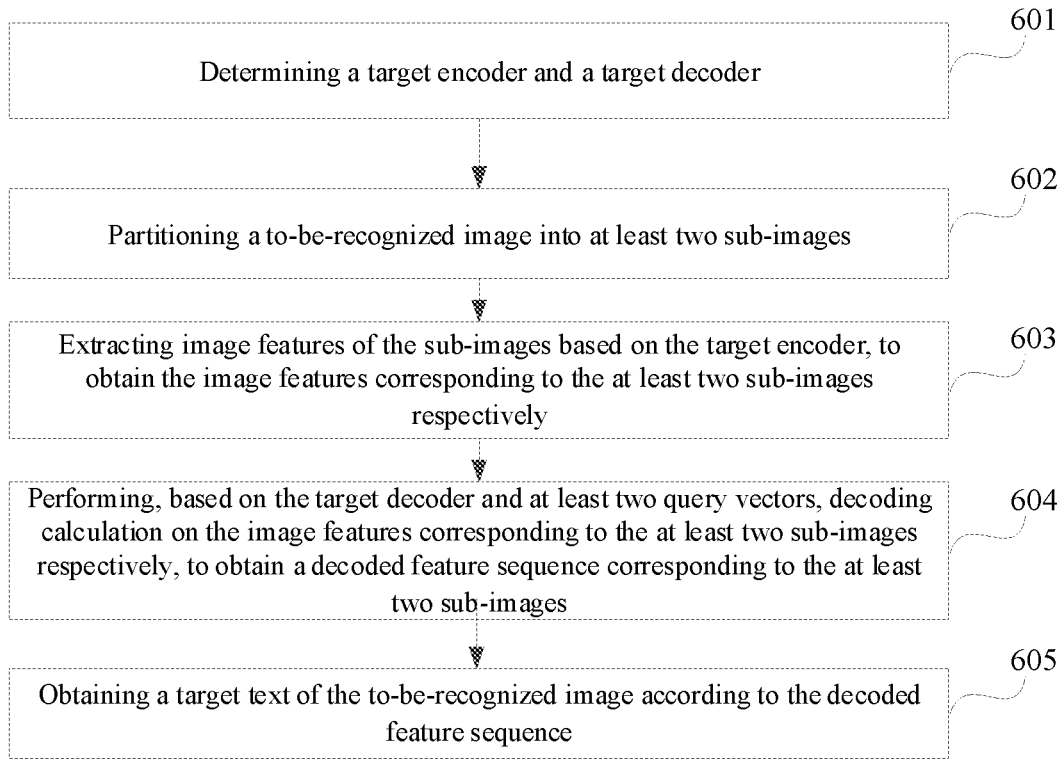
FIG. 6 is a flowchart of a character recognition method provided according to a fifth embodiment of the present disclosure.

In specific application stage, as shown in FIG. 6, FIG. 6 is a flowchart of a character recognition method provided according to a fifth embodiment of the present disclosure, the method may include the following steps.

601: determining a target encoder and a target decoder; where the target encoder is obtained by training based on the character recognition model training method according to the above embodiments, and the target decoder is obtained by training based on the character recognition model training method according to the above embodiments.

602: partitioning a to-be-recognized image into at least two sub-images.

603: extracting image features of the sub-images based on the target encoder, to obtain the image features corresponding to the at least two sub-images respectively.

604: performing, based on the target decoder and at least two query vectors, decoding calculation on the image features corresponding to the at least two sub-images respectively, to obtain a decoded feature sequence corresponding to the at least two sub-images.

605: obtaining a target text of the to-be-recognized image according to the decoded feature sequence.

In the present embodiment, the target encoder and the target decoder are used to perform feature sequence calculation of the to-be-recognized image so as to obtain an accurate decoded feature sequence, so that the target text is obtained by performing text recognition by using the decoded feature sequence. The target text can be accurately recognized by using the target encoder and the target decoder.

Figure 7:
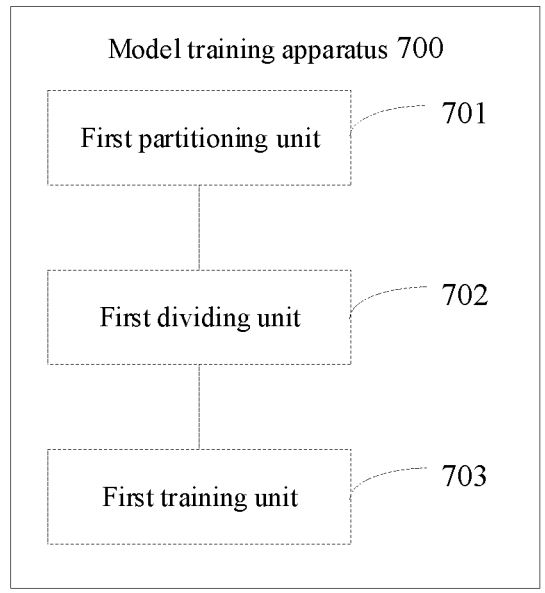
FIG. 7 is a structural diagram of a character recognition model training apparatus provided according to a sixth embodiment of the present disclosure.

As shown in FIG. 7, FIG. 7 is a structural diagram of a character recognition model training apparatus provided according to a sixth embodiment of the present disclosure. The character recognition model training apparatus 700 may include:
- a first partitioning unit 701, configured to partition an untagged training sample into at least two sub-sample images;
- a first dividing unit 702, configured to divide the at least two sub-sample images into a first training set and a second training set; where the first training set includes a first sub-sample image with a visible attribute, and the second training set includes a second sub-sample image with an invisible attribute;
- a first training unit 703, configured to perform self-supervised training on a to-be-trained encoder by taking the second training set as a tag of the first training set, to obtain a target encoder.

As an embodiment, the first training unit includes:
- a first obtaining module, configured to initialize the to-be-trained encoder to obtain a first encoder;
- a first extracting module, configured to extract, based on the first encoder, a first visual feature of the first sub-sample image in the first training set and a second visual feature of the second sub-sample image in the second training set;
- a first calculating module, configured to perform mask query calculation on the first visual feature, to obtain a third visual feature;
- a first training module, configured to update the first encoder according to a feature error between the third visual feature and the second visual feature until the feature error satisfies a first error condition, and determine a latest updated first encoder as the target encoder.

In some embodiments, the first training module includes:
- a decoding-determining sub-module, configured to initialize a to-be-trained decoder to obtain a first decoder;
- a first error sub-module, configured to determine, based on the first decoder, an image error generated when image reconstruction is performed on the third visual feature;
- a second error sub-module, configured to determine the feature error between the third visual feature and the second visual feature; and
- a first updating sub-module, configured to update the first encoder based on the feature error and the image error and update the first decoder based on the image error until the feature error satisfies the first error condition and the image error satisfies a second error condition, and determine a latest obtained first encoder as the target encoder.

In a possible design, the first error sub-module is specifically configured to:
- perform decoding calculation processing on the third visual feature by using the first decoder, to obtain a first decoded feature; and
- obtain the image error according to an image reconstruction result of the first decoded feature.

As an optional implementation, the first error sub-module is further specifically configured to:
- perform image reconstruction processing on the first decoded feature, to obtain a first prediction result; and
- perform image error calculation by using the second sub-sample image and the first prediction result, to obtain the image error.

As an embodiment, the apparatus further includes:
- a query determining unit, configured to divide, based on a mask setting strategy, at least two query vectors into a first query vector and a second query vector; where the mask setting strategy includes mask data generated based on a preset first mask ratio; the query vector is a spatial transformation vector corresponding to a basis character string;
- the first calculating module includes:
- a vector-calculating sub-module, configured to obtain, based on feature prediction calculation of the second query vector and the first visual feature, a feature vector corresponding to an occurrence probability of the first visual feature in the second query vector;

a vector-combining sub-module, configured to perform vector combination on the feature vector corresponding to the first visual feature, to obtain the third visual feature.

As another embodiment, the first dividing unit includes:

a first dividing module, configured to divide the at least two sub-sample images into the first training set and the second training set by using a mask setting strategy.

Figure 8:
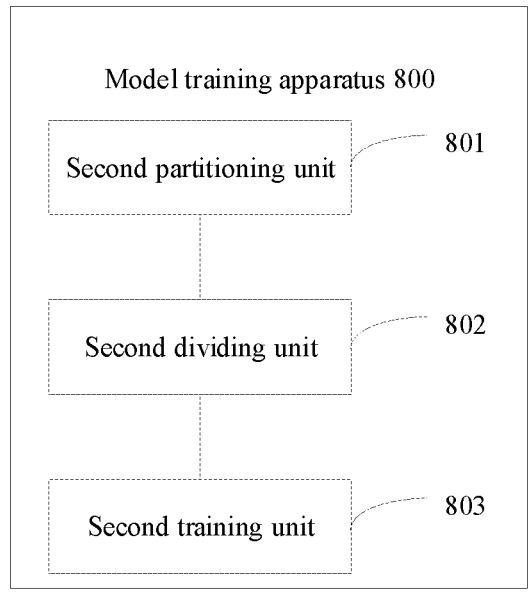
FIG. 8 is a structural diagram of a character recognition model training apparatus provided according to a seventh embodiment of the present disclosure.

As shown in FIG. 8, FIG. 8 is a structural diagram of a character recognition model training apparatus provided according to a seventh embodiment of the present disclosure. The character recognition model training apparatus 800 may include:

a second partitioning unit 801, configured to partition a synthetic sample into at least two sub-synthetic images, where the synthetic sample includes a synthetic text tag;

a second dividing unit 802, configured to divide the at least two sub-synthetic images as a first synthetic set and a second synthetic set; where the first synthetic set includes a first sub-synthetic image with a visible attribute, and the second synthetic set includes a second sub-synthetic image with an invisible attribute; and a second training unit 803, configured to perform, based on the first synthetic set and the second synthetic set, supervised training on a to-be-trained decoder to obtain a target decoder corresponding to the to-be-trained decoder.

As an embodiment, the second training unit includes:

a second extracting module, configured to extract, based on a target encoder, a first feature sequence of the first sub-synthetic image in the first synthetic set; where the target encoder is obtained by training based on the character recognition model training method according to the above embodiments;

a feature-completing module, configured to perform feature completion on the first feature sequence according to an image position, in the synthetic sample, of the second sub-synthetic image in the second synthetic set, to obtain a second feature sequence; and a second training module, configured to train, by taking that a predictive text of the second feature sequence predicted by the to-be-trained decoder is same as a synthetic text of the second sub-synthetic image in the synthetic text tag as a training objective, to obtain the target decoder corresponding to the to-be-trained decoder.

In some embodiments, the second training module includes:

a first obtaining sub-module, configured to initialize the to-be-trained decoder to obtain a second decoder;

a text-predicting sub-module, configured to determine the predictive text of the second feature sequence based on the second decoder;

a third error sub-module, configured to perform text error calculation by using the predictive text and the synthetic text of the second sub-synthetic image in the synthetic text tag, to obtain a decoding error; and a second updating sub-module, configured to update the second decoder according to the decoding error until the decoding error satisfies a third error condition, and determine a latest obtained second decoder as the target decoder.

In a possible design, the text-predicting sub-module is specifically configured to:

acquire, based on the second sub-synthetic image, a third query vector stored in a token form;

input the third query vector and the second feature sequence into the second decoder, to obtain a second decoded feature; and obtain the predictive text of the second feature sequence based on text recognition processing on the second decoded feature.

In some embodiments, the text-predicting sub-module is specifically configured to:

extract a feature of the second sub-synthetic image;

transform, based on a token-generating algorithm, the feature of the second sub-synthetic image into the token form, to obtain the third query vector.

In a possible design, the feature-completing module includes:

a position-determining sub-module, configured to determine, according to the image position of the second sub-synthetic image in the synthetic sample, a sequence position of the second sub-synthetic image in a synthetic sequence corresponding to the synthetic sample;

a vector-inserting sub-module, configured to insert a completion vector in the sequence position in the first feature sequence, to obtain the second feature sequence.

In some embodiments, the second dividing unit includes:

a second dividing module, configured to divide, based on a mask synthesis strategy, the at least two sub-synthetic images as the first synthetic set and the second synthetic set; where the mask synthesis strategy includes mask data generated based on a preset second mask ratio.

Figure 9:
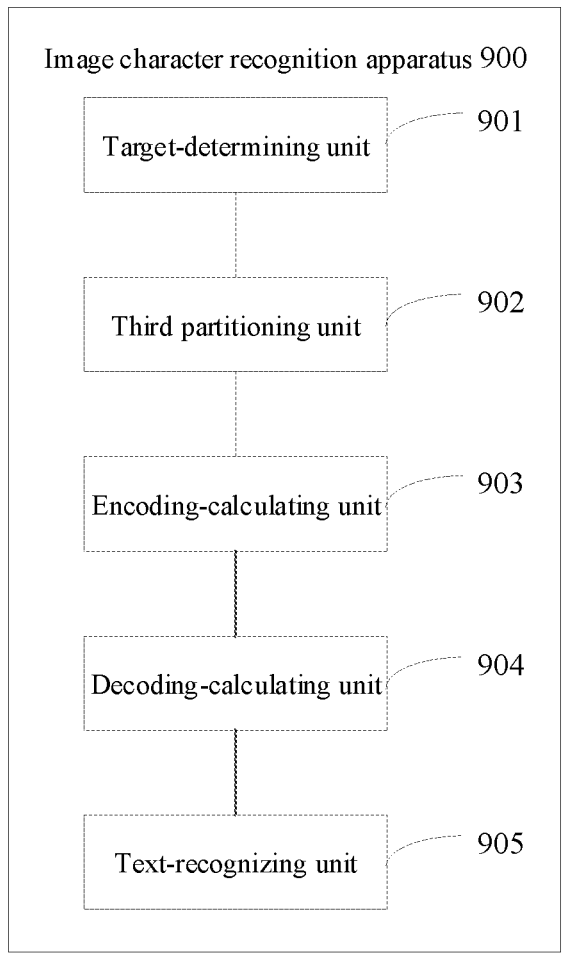
FIG. 9 is a structural diagram of a character recognition apparatus provided according to an eighth embodiment of the present disclosure.

As shown in FIG. 9, FIG. 9 is a structural diagram of a character recognition apparatus provided according to an eighth embodiment of the present disclosure. The character recognition apparatus 900 may include:

a target-determining unit 901, configured to determine a target encoder and a target decoder; where the target encoder is obtained by training based on the character recognition model training method according to the above embodiments, and the target decoder is obtained by training based on the character recognition model training method according to the above embodiments;

a third partitioning unit 902, configured to partition, for a to-be-recognized image, the to-be-recognized image into at least two sub-images;

an encoding-calculating unit 903, configured to extract image features of the sub-images based on the target encoder, to obtain the image features corresponding to the at least two sub-images respectively;

a decoding-calculating unit 904, configured to perform, based on the target decoder and at least two query vectors, decoding calculation on the image features corresponding to the at least two sub-images respectively, to obtain a decoded feature sequence corresponding to the at least two sub-images; and a text-recognizing unit 905, configured to obtain a target text of the to-be-recognized image according to the decoded feature sequence.

The apparatus provided in the present disclosure can be used to execute the method of the above embodiments, and for contents related to execution by each unit, module or sub-module, reference can be made to the description of the above embodiments, which will not be repeated here.

It should be noted that the encoder and decoder in the present embodiments are not aimed at a specific user, and cannot reflect personal information of a specific user. It should be noted that the training samples, synthetic samples and to-be-recognized images in the present embodiments originate from public data sets.

In the technical solution of the present disclosure, the collection, storage, use, processing, transmission, provision and disclosure of personal information of users are all in line with the provisions of relevant laws and regulations, and do not violate public order and good customs.

According to embodiments of the present disclosure, the present disclosure further provides an electronic device, a readable storage medium and a computer program product.

According an embodiment of the present disclosure, the present disclosure further provides a computer program product. The computer program product includes a computer program, where the computer program is stored in a readable storage medium, at least one processor of an electronic device may read the computer program from the readable storage medium, and the at least one processor executes the computer program to cause the electronic device to perform the solution according to any one of the above embodiments.

Figure 10:
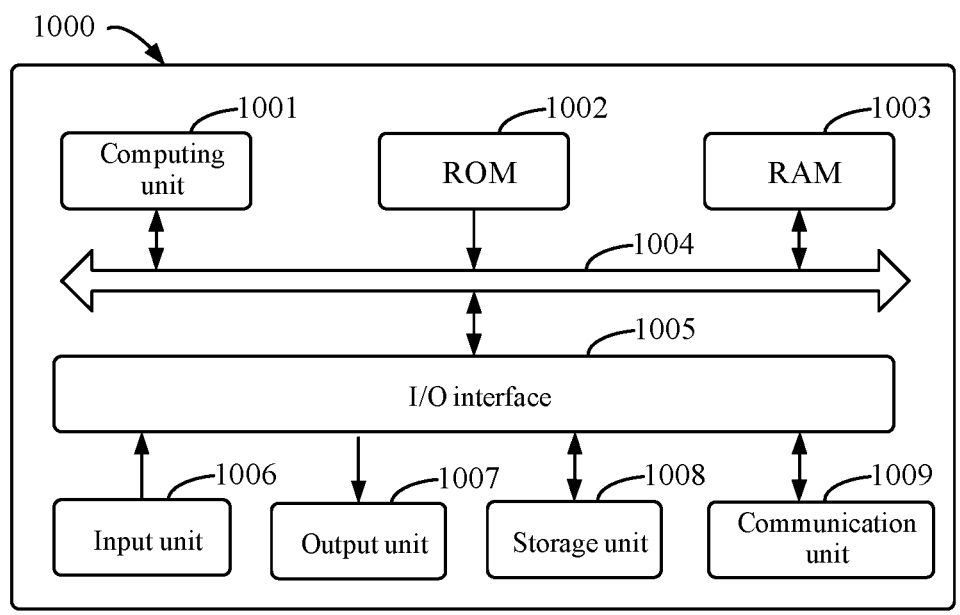
FIG. 10 is a block diagram of an electronic device for implementing the character recognition model training method or the character recognition method according to the embodiments of the present disclosure.

FIG. 10 shows a schematic block diagram of an exemplary electronic device 1000 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may also include a computing node in a cloud server. The electronic device may also represent various forms of mobile devices, such as a personal digital assistant, a cellular phone, a smart phone, a wearable device and other similar computing devices. The components shown herein, their connections and relationships, and their functions are only examples, and are not intended to limit the implementation of the present disclosure described and/or claimed herein.

As shown in FIG. 10, the device 1000 includes a computing unit 1001, which can perform various appropriate actions and processes according to a computer program stored in a read only memory (ROM) 1002 or a computer program loaded from a storage unit 1008 into a random access memory (RAM) 1003. In the RAM 1003, various programs and data required for the operation of the device 1000 can also be stored. The computing unit 1001, the ROM 1002, and the RAM 1003 are connected to each other through a bus 1004. An input/output (I/O) interface 1005 is also connected to the bus 1004.

At least two components in the device 1000 are connected to the I/O interface 1005, including an input unit 1006, such as a keyboard, a mouse, etc.; an output unit 1007, such as various types of displays, speakers, etc.; a storage unit 1008, such as a magnetic disk, an optical disk, etc.; and a communication unit 1009, such as a network card, a modem, a wireless communication transceiver, etc. The communication unit 1009 allows the device 1000 to exchange information/data with other devices through a computer network such as the Internet and/or various telecommunication networks.

The computing unit 1001 can be various general-purpose and/or special-purpose processing components with processing and computing capabilities. Some examples of the computing unit 1001 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, micro-controller, etc. The computing unit 1001 executes the various methods and processes described above, such as the character recognition model training method or the character recognition method. For example, in some embodiments, the character recognition model training method or the character recognition method can be implemented as a computer software program tangibly embodied in a machine-readable medium, such as the storage unit 1008. In some embodiments, part or all of the computer program can be loaded and/or installed on the device 1000 via the ROM 1002 and/or the communication unit 1009. When the computer program is loaded into the RAM 1003 and executed by the computing unit 1001, one or more steps of the character recognition model training method or the character recognition method described above can be performed. Alternatively, in other embodiments, the computing unit 1001 may be configured to execute the character recognition model training method or the character recognition method by any other suitable means (for example, by means of firmware).

The various embodiments of the systems and technologies described above can be implemented in a digital electronic circuit system, an integrated circuit system, a field programmable gate array (FPGA), an application specific integrated circuit (ASIC), an application specific standard products (ASSP), a system-on-chip (SOC), a complex programmable logic device (CPLD), computer hardware, firmware, software, and/or combinations thereof. These various embodiments may include: being implemented in one or more computer programs that can be executed and/or interpreted on a programmable system including at least one programmable processor, which can be a special-purpose or general-purpose programmable processor that can receive data and instructions from and transmit data and instructions to a storage system, at least one input apparatus, and at least one output apparatus.

The program codes for implementing the method of the present disclosure can be written in any combination of one or more programming languages. These program codes may be provided to the processors or controllers of general-purpose computers, special-purpose computers or other programmable data processing apparatuses, so that when executed by the processors or controllers, the program codes cause the functions/operations specified in the flowcharts and/or block diagrams to be implemented. The program codes can be completely executed on the machine, partially executed on the machine, partially executed on the machine as an independent software package, partially executed on a remote machine or completely executed on a remote machine or server.

In the context of the present disclosure, a machine-readable medium can be a tangible medium that can contain or store a program for use by or in connection with an instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable combination of the above. More specific examples of the machine-readable storage medium will include electrical connection based on one or more wires, portable computer disk, hard disk, random access memory (RAM), read-only memory (ROM), erasable programmable read-only memory (EPROM or flash memory), optical fiber, compact disk read-only memory (CD-ROM), optical storage device, magnetic storage device, or any suitable combination of the above.

To provide interaction with users, the systems and technologies described herein can be implemented on a computer, which has a display device (for example, a CRT (cathode ray tube) or an LCD (liquid crystal display) monitor) for displaying information to users; and a keyboard and a pointing apparatus (for example, a mouse or a trackball) through which a user can provide input to the computer. Other kinds of apparatus can also be used to provide interaction with users; for example, the feedback provided to the user can be any form of sensory feedback (e.g., visual feedback, auditory feedback, or tactile feedback); and the input from the user can be received in any form (including acoustic input, voice input or tactile input).

The systems and technologies described herein can be implemented in a computing system including a back-end component (e.g., as a data server), a computing system including a middleware component (e.g., an application server), or a computing system including a front-end component (e.g., a user computer with a graphical user interface or a web browser through which users can interact with the embodiments of the systems and technologies described herein), or a computer system including any combination of such back-end component, middleware component, or front-end component. The components of the system can be connected to each other by digital data communication in any form or medium (e.g., communication network). Examples of the communication network include: a local area network (LAN), a wide area network (WAN) and the Internet.

A computer system may include a client and a server. The client and the server are usually far away from each other and usually interact through a communication network. The relationship between the client and the server is generated by computer programs running on corresponding computers and having a client-server relationship with each other. The server may be a cloud server, which is also known as a cloud computing server or a cloud host, which is a host product in the cloud computing service system, so as to solve the shortcomings of traditional physical host and VPS service ("Virtual Private Server", or "VPS" for short), such as difficulty in management and weakness in business scalability. The server can also be a server of a distributed system or a server combined with a block chain.

It should be understood that steps can be reordered, added, or deleted using various forms of processes shown above. For example, the steps described in the present disclosure can be executed in parallel, sequentially or in different orders, so long as the desired results of the technical solutions disclosed in the present disclosure can be achieved, which is not limited here.

The above specific embodiments do not limit the scope of protection of the present disclosure. Those of ordinary skills in the art should understand that various modifications, combinations, sub-combinations and substitutions can be made according to design requirements and other factors. Any modification, equivalent substitution and improvement made within the spirit and principle of the present disclosure shall be included in the scope of protection of the present disclosure.

What is claimed is:

1. A character recognition method being applied to a server and comprising:
    partitioning an untagged training sample into at least two sub-sample images;
    dividing the at least two sub-sample images into a first training set and a second training set; wherein the first training set comprises a first sub-sample image with a visible attribute, and the second training set comprises a second sub-sample image with an invisible attribute;
    performing self-supervised training on a to-be-trained encoder by taking the second training set as a tag of the first training set, to obtain a target encoder;
    wherein the performing the self-supervised training on the to-be-trained encoder by taking the second training set as the tag of the first training set, to obtain the target encoder comprises:
    initializing the to-be-trained encoder to obtain a first encoder;
    extracting, based on the first encoder, a first visual feature of the first sub-sample image in the first training set and a second visual feature of the second sub-sample image in the second training set;
    performing mask query calculation on the first visual feature, to obtain a third visual feature; and
    updating the first encoder according to a feature error between the third visual feature and the second visual feature until the feature error satisfies a first error condition, and determining a latest updated first encoder as the target encoder;
    wherein the updating the first encoder according to the feature error between the third visual feature and the second visual feature until the feature error satisfies the first error condition, and the determining the latest updated first encoder as the target encoder comprise:
    initializing a to-be-trained decoder to obtain a first decoder;
    determining, based on the first decoder, an image error generated when image reconstruction is performed on the third visual feature;
    determining the feature error between the third visual feature and the second visual feature; and
    updating the first encoder based on the feature error and the image error and updating the first decoder based on the image error until the feature error satisfies the first error condition and the image error satisfies a second error condition, and determining a latest obtained first encoder as the target encoder;
    receiving a to-be-recognized image sent by a terminal device, and performing, based on the target encoder and the updated first decoder, image features extraction on the to-be-recognized image to obtain a target text; and
    sending the target text to the terminal device.

2. The method according to claim 1, wherein the determining, based on the first decoder, the image error generated when the image reconstruction is performed on the third visual feature comprises:
    performing decoding calculation processing on the third visual feature by using the first decoder, to obtain a first decoded feature; and
    obtaining the image error according to an image reconstruction result of the first decoded feature.

3. The method according to claim 2, wherein the obtaining the image error according to the image reconstruction result of the first decoded feature comprises:

performing image reconstruction processing on the first decoded feature, to obtain a first prediction result; and performing image error calculation by using the second sub-sample image and the first prediction result, to obtain the image error.

4. The method according to claim 1, further comprising:

dividing, based on a mask setting strategy, at least two query vectors into a first query vector and a second query vector; wherein the mask setting strategy comprises mask data generated based on a preset first mask ratio; the at least two query vectors are spatial transformation vectors corresponding to a basis character string;

the performing the mask query calculation on the first visual feature, to obtain the third visual feature comprises:

obtaining, based on feature prediction calculation of the second query vector and the first visual feature, a feature vector corresponding to an occurrence probability of the first visual feature in the second query vector; and performing vector combination on the feature vector corresponding to the first visual feature, to obtain the third visual feature.

5. The method according to claim 1, wherein the dividing the at least two sub-sample images into the first training set and the second training set comprises:

dividing the at least two sub-sample images into the first training set and the second training set by using a mask setting strategy.

6. A character recognition apparatus comprising:

at least one processor; and a memory communicatively connected to the at least one processor; wherein, the memory stores an instruction executable by the at least one processor, and the instruction is executed by the at least one processor to cause the at least one processor to perform the method according to claim 1.

7. A non-transitory computer-readable storage medium storing a computer instruction, wherein the computer instruction is used to cause a computer to perform the method according to claim 1.

8. A character recognition model training method comprising:

partitioning a synthetic sample into at least two sub-synthetic images, wherein the synthetic sample comprises a synthetic text tag;

dividing the at least two sub-synthetic images as a first synthetic set and a second synthetic set; wherein the first synthetic set comprises a first sub-synthetic image with a visible attribute, and the second synthetic set comprises a second sub-synthetic image with an invisible attribute; and performing, based on the first synthetic set and the second synthetic set, supervised training on a to-be-trained decoder to obtain a target decoder corresponding to the to-be-trained decoder;

wherein the performing, based on the first synthetic set and the second synthetic set, the supervised training on the to-be-trained decoder to obtain the target decoder corresponding to the to-be-trained decoder comprises:

extracting, based on a target encoder, a first feature sequence of the first sub-synthetic image in the first synthetic set; wherein the target encoder is obtained by performing following steps:

partitioning an untagged training sample into at least two sub-sample images;

dividing the at least two sub-sample images into a first training set and a second training set; wherein the first training set comprises a first sub-sample image with a visible attribute, and the second training set comprises a second sub-sample image with an invisible attribute; and performing self-supervised training on a to-be-trained encoder by taking the second training set as a tag of the first training set, to obtain the target encoder;

performing feature completion on the first feature sequence according to an image position, in the synthetic sample, of the second sub-synthetic image in the second synthetic set, to obtain a second feature sequence; and training, by taking that a predictive text of the second feature sequence predicted by the to-be-trained decoder is the same as a synthetic text of the second sub-synthetic image in the synthetic text tag as a training objective, to obtain the target decoder corresponding to the to-be-trained decoder.

9. The method according to claim 8, wherein the training, by taking that the predictive text of the second feature sequence predicted by the to-be-trained decoder is same as the synthetic text of the second sub-synthetic image in the synthetic text tag as the training objective, to obtain the target decoder corresponding to the to-be-trained decoder comprises:

initializing the to-be-trained decoder to obtain a second decoder;

determining the predictive text of the second feature sequence based on the second decoder;

performing text error calculation by using the predictive text and the synthetic text of the second sub-synthetic image in the synthetic text tag, to obtain a decoding error; and updating the second decoder according to the decoding error until the decoding error satisfies a third error condition, and determining a latest obtained second decoder as the target decoder.

10. The method according to claim 9, wherein the determining the predictive text of the second feature sequence based on the second decoder comprises:

acquiring, based on the second sub-synthetic image, a third query vector stored in a token form;

inputting the third query vector and the second feature sequence into the second decoder, to obtain a second decoded feature; and obtaining the predictive text of the second feature sequence based on text recognition processing on the second decoded feature.

11. The method according to claim 10, wherein the acquiring, based on the second sub-synthetic image, the third query vector stored in the token form comprises:

extracting a feature of the second sub-synthetic image; and transforming, based on a token-generating algorithm, the feature of the second sub-synthetic image into the token form, to obtain the third query vector.

12. The method according to claim 8, wherein the performing the feature completion on the first feature sequence according to the image position, in the synthetic sample, of the second sub-synthetic image in the second synthetic set, to obtain the second feature sequence comprises:

determining, according to the image position of the second sub-synthetic image in the synthetic sample, a sequence position of the second sub-synthetic image in a synthetic sequence corresponding to the synthetic sample; and inserting a completion vector in the sequence position in the first feature sequence, to obtain the second feature sequence.

13. The method according to claim 8, wherein the dividing the at least two sub-synthetic images as the first synthetic set and the second synthetic set comprises:

dividing, based on a mask synthesis strategy, the at least two sub-synthetic images as the first synthetic set and the second synthetic set; wherein the mask synthesis strategy comprises mask data generated based on a preset second mask ratio.

14. A character recognition apparatus comprising:
at least one processor; and
a memory communicatively connected to the at least one processor; wherein,
the memory stores an instruction executable by the at least one processor, and the instruction is executed by the at least one processor to cause the at least one processor to perform the method according to claim 8.

15. A non-transitory computer-readable storage medium storing a computer instruction, wherein the computer instruction is used to cause a computer to perform the method according to claim 8.

16. A character recognition method comprising:
determining a target encoder and a target decoder; wherein the target encoder is obtained by performing following steps:

partitioning an untagged training sample into at least two sub-sample images;

dividing the at least two sub-sample images into a first training set and a second training set; wherein the first training set comprises a first sub-sample image with a visible attribute, and the second training set comprises a second sub-sample image with an invisible attribute; and performing self-supervised training on a to-be-trained encoder by taking the second training set as a tag of the first training set, to obtain the target encoder;

wherein the target decoder is obtained by performing following steps:

partitioning a synthetic sample into at least two sub-synthetic images, wherein the synthetic sample comprises a synthetic text tag;

dividing the at least two sub-synthetic images as a first synthetic set and a second synthetic set; wherein the first synthetic set comprises a first sub-synthetic image with a visible attribute, and the second synthetic set comprises a second sub-synthetic image with an invisible attribute; and performing, based on the first synthetic set and the second synthetic set, supervised training on a to-be-trained decoder to obtain the target decoder corresponding to the to-be-trained decoder;

partitioning a to-be-recognized image into at least two sub-images;

extracting image features of the sub-images based on the target encoder, to obtain the image features corresponding to the at least two sub-images respectively;

performing, based on the target decoder and at least two query vectors, decoding calculation on the image features corresponding to the at least two sub-images respectively, to obtain a decoded feature sequence corresponding to the at least two sub-images; and obtaining a target text of the to-be-recognized image according to the decoded feature sequence.

17. A character recognition apparatus comprising:
at least one processor; and
a memory communicatively connected to the at least one processor; wherein,
the memory stores an instruction executable by the at least one processor, and the instruction is executed by the at least one processor to cause the at least one processor to perform the method according to claim 16.

* * * * *